(12) United States Patent
Dailey et al.

(10) Patent No.: US 6,457,739 B1
(45) Date of Patent: Oct. 1, 2002

(54) INSTRUMENT PANEL HAVING AN AIR BAG DEVICE

(75) Inventors: Daniel P. Dailey, West Bloomfield, MI (US); Matthew T. Kemp, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/825,272

(22) Filed: Apr. 3, 2001

(51) Int. Cl.[7] .............................................. B60R 21/20
(52) U.S. Cl. ...................... 280/728.3; 280/732
(58) Field of Search .............................. 280/728.3, 732, 280/728.2

(56) References Cited

U.S. PATENT DOCUMENTS

| 5,316,335 A | 5/1994 | Gray et al. |
| 5,372,379 A | 12/1994 | Parker |
| 5,460,402 A | 10/1995 | Rhodes, Jr. |
| 5,560,646 A | 10/1996 | Gray et al. |
| 5,775,727 A | * 7/1998 | Sun et al. ................. 280/728.3 |
| 5,797,619 A | 8/1998 | Bauer et al. |
| 5,845,931 A | 12/1998 | Nagy et al. |
| 5,863,062 A | 1/1999 | Harada et al. |
| 6,113,131 A | * 9/2000 | Uehara et al. ........... 280/728.3 |

\* cited by examiner

Primary Examiner—Peter C. English
(74) Attorney, Agent, or Firm—Brinks Hofer Gilson & Lione

(57) ABSTRACT

An instrument panel for an automobile passenger compartment includes a substrate with an opening, an air bag device coupled with the substrate, a door panel pivotally connected to the substrate, an adhesive tape affixed to the door panel and to portions of the substrate, a skin covering extending over the substrate, and a foam disposed between the skin and the substrate.

7 Claims, 3 Drawing Sheets

INSTRUMENT PANEL HAVING AN AIR BAG DEVICE

TECHNICAL FIELD AND BACKGROUND OF THE INVENTION

This patent discloses and claims a useful, novel, and unobvious invention for an automobile instrument panel having an air bag device. Typically, the skin covering of an instrument panel for an automotive passenger compartment includes a foam layer to provide a contoured and padded finish to the instrument panel. This foam layer is typically injected as a liquid between the underlying substrate of the instrument panel and the skin covering. In instrument panels having an air bag device, there is a need to form a seal to prevent liquid foam from leaking into the air bag device.

DETAILED DESCRIPTION OF THE PREFERRED EMBODIMENTS

The following description of the preferred embodiments of the invention is not intended to limit the scope of the invention to these two embodiments, but rather to enable any person skilled in the art to make and use the invention. Referring to the Figures, wherein like numerals indicate like or corresponding parts throughout the several views, an instrument panel for an automobile passenger compartment is shown generally at 10.

Figure 1:
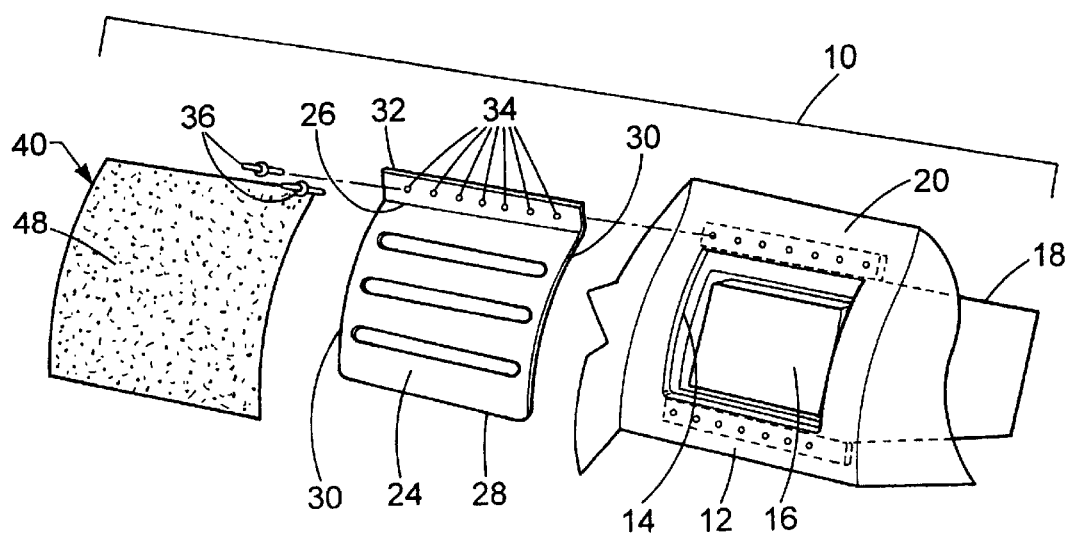
FIG. 1 is an exploded view of a first preferred embodiment of the present invention showing a substrate, a door panel, and adhesive tape.
Figure 2:
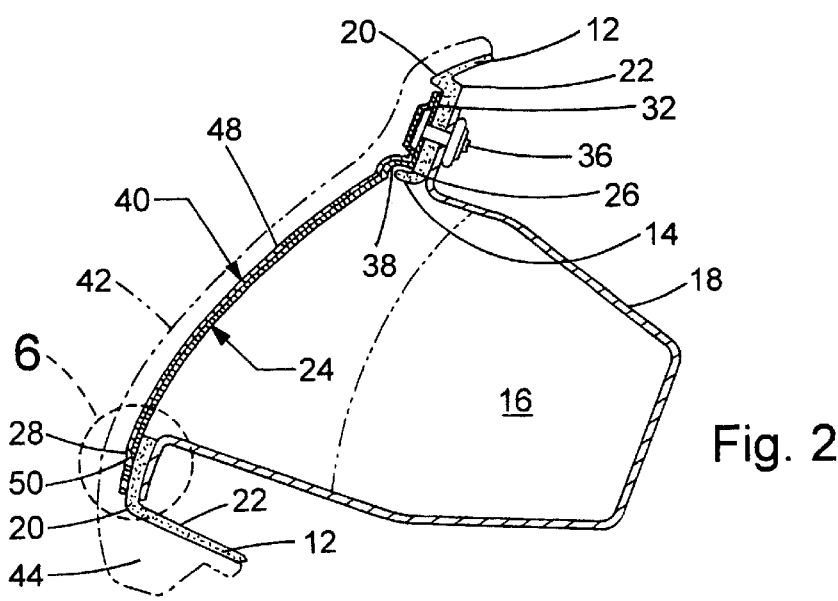
FIG. 2 is a side sectional view of the instrument panel.
Figure 3:
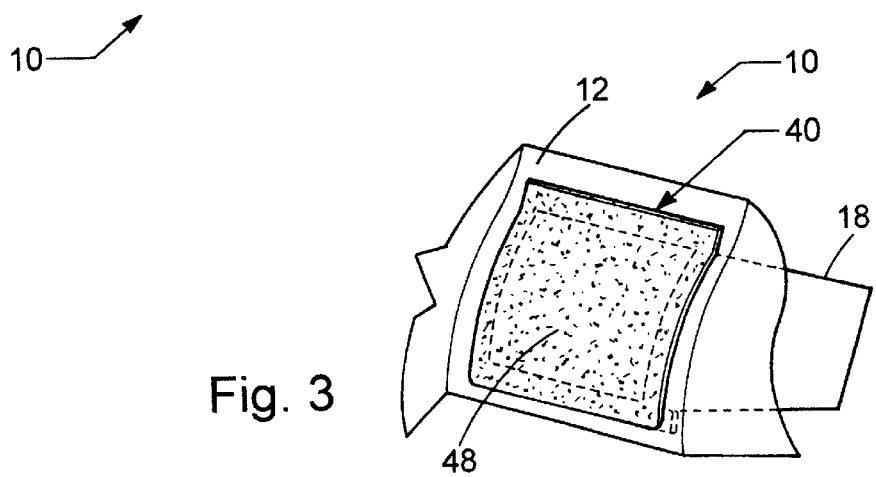
FIG. 3 is a perspective view of the instrument panel showing the substrate, the door panel, and the adhesive tape affixed to the door panel and the substrate.

Referring to FIGS. 1 through 3, the instrument panel 10 includes a substrate 12 that forms the underlying structure for the instrument panel 10. The substrate 12 can be made from any suitable rigid material. In the preferred embodiment, the substrate 12 is formed from plastic. The substrate 12 includes an opening 14 which is sized to allow an air bag 16 to deploy through the substrate 12. The air bag 16 is preferably mounted within a canister 18 that houses the air bag 16 and the air bag components. The substrate 12 includes a front side 20 facing the interior of the automobile, and a back side 22 facing away from the interior of the automobile. The canister 18 is generally box shaped with four side walls, a rear wall, and a front opening defined by the four side walls. The canister 18 is coupled within the back side 22 of the substrate 12 such that the front opening of the canister 18 is aligned with the opening 14 of the substrate 12. When the air bag 16 is deployed, the air bag 16 rapidly expands outward through the front opening in the canister 18 and the opening 14 in the substrate 12 into the interior of the vehicle.

The instrument panel 10 also includes a door panel 24 to cover the opening 14 of the substrate 12. The door panel 24 is generally the same shape as the opening 14 of the substrate 12 such that the door panel 24 completely covers the opening 14 when in place. Preferably, the door panel 24 is generally rectangular with a top edge 26, a bottom edge 28 and two side edges 30. The door panel 24 preferably includes a top flap 32 extending from the top edge 26 of the door panel 24 to allow the door panel 24 to be attached to the substrate 12. The top flap 32 preferably includes apertures 34 for receiving fasteners 36 to secure the door panel 24 to the substrate 12. It is to be understood however, that the door panel 24 could be secured to the substrate 12 by other appropriate methods. The top flap 32 is pivotally connected to the door panel 24 to allow the door panel 24 to pivot with relation to the substrate 12. In this way, the door panel 24 can pivot between a closed position, where the door panel 24 is resting aligned with the substrate 12 and the opening 14 is covered, and an open position, where the door panel 24 is pivoted outward from the substrate 12 and the opening 14 is un-covered.

The door panel 24 can be attached to the top flap 32 by any pivotal means. In the preferred embodiment, the top flap 32 and the door panel 24 are formed from a single piece of stamped metal, preferably aluminum. When the door panel 24 pivots from the closed position to the open position, the single stamped piece of aluminum bends at a point between the door panel 24 and the top flap 32. The single piece stamping includes a contour lip 38 between the door panel 24 and the top flap 32 to provide a pre-determined crease line to allow proper pivotal movement of the door panel 24 in relation to the substrate 12.

The instrument panel 10 includes an adhesive tape 40 affixed to the door panel 24 and to the substrate 12 to secure the door panel 24 in the closed position. The adhesive tape 40 covers the door panel 24 and extends onto portions of the substrate 12. The adhesive tape 40 also serves a second function by providing a sealed engagement between the edges 26, 28, 30 of the door panel 24 and the substrate 12.

In the preferred embodiment, an outer skin covering 42 extends over the substrate 12 to conceal the substrate 12 and provide an aesthetically pleasing appearance to the interior of the vehicle. Also in the preferred embodiment, a foam 44 fills between the skin covering 42 and the substrate 12 to support the skin covering 42 and to provide padding between the skin covering 42 and the substrate 12. The skin covering 42 can be formed from any suitable material such as PVC (polyvinyl chloride), thermoplastic urethane, ABS (acrylonitile-butadiene-styrene), TPO (thermoplastic olefins), ASA (acrylonitrile-styrene-acrylic), or blended elastomeric thermoplastic polymers and polyolefins. The foam 44 can be made from any suitable material such as poly-urethane, PVC, poly-ethylene or polypropylene. The exact material used for the skin covering 42 and the foam 44 will depend on the functional as well as aesthetic requirements of the particular application.

To prevent the skin covering 42 from hindering the effective opening of the door panel 24, the skin covering 42 preferably includes a pre-weakened seam formed on the inner surface of the skin covering 42 opposite the interior of the vehicle. The seam is formed in a generally U-shape to fall immediately over the door panel 24 such that when the air bag 16 is deployed, and the door panel 24 is forced open, the skin covering 42 will tear along the seam to allow the door panel 24 to pivot outward through the skin covering 42 to the open position. By forming a pre-weakened seam within the skin covering 42, the tearing of the skin covering 42 is controlled. The pre-weakened seam can be formed in the skin 42 by laser scoring, mechanical scoring, molded in groove, or any other known method.

The adhesive tape 40 preferably includes a tearable paper backing 48 opposite the substrate 12 to provide additional strength while allowing tear fracture of the tape 40 when the door panel 24 is forced open by the deployment of the air bag 16. In the preferred embodiment, the adhesive tape 40 has sufficient adhesion strength to allow the tape 40 to maintain adhesion to the door panel 24 and to the substrate 12 under all normal operating conditions as well as when the air bag 16 is deployed and the door panel 24 is forced open. In the preferred embodiment, the adhesion tape 40 is 3M brand High Performance Adhesive Transfer Tape model 9485PC, although it is to be understood that any equivalent adhesive tape 40 could be used. In the preferred embodiment, the adhesive tape 40 is applied as one sheet which is adapted to completely cover the door panel 24 and to extend outward onto portions of the substrate 12 adjacent to the door panel, as shown in the Figures.

Figure 6:
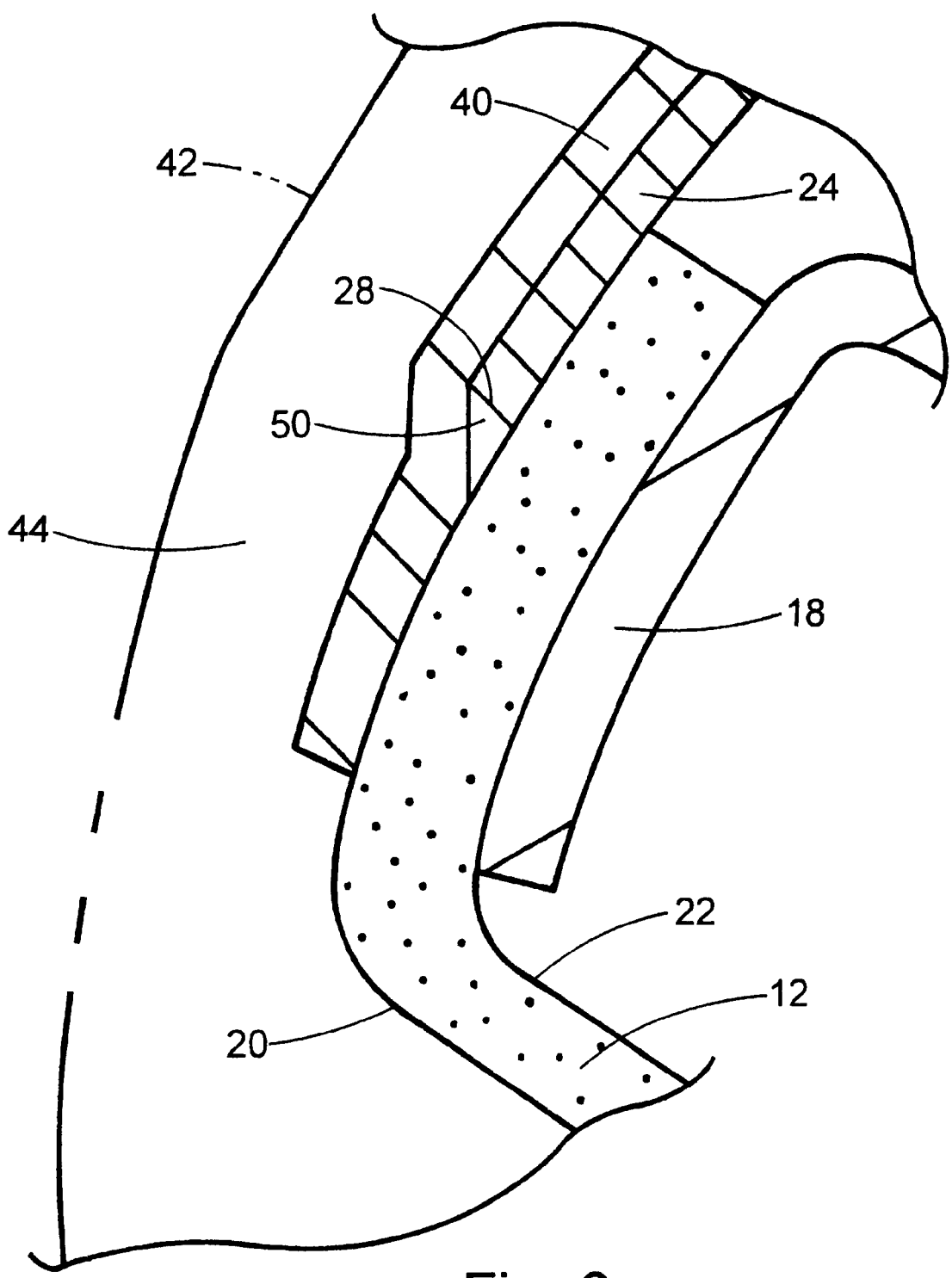
FIG. 6 is an enlarged view of a portion of FIG. 2.

Typically, when the door panel 24 is in the closed position, there is a gap 50 between the edges 26, 28, 30 of the door panel 24 and the periphery of the opening 14 in the substrate 12. When the tape 40 is applied, the adhesive will firmly hold the tape 40 to the door panel 24 and to the substrate 12. The portion of the tape 40 that extends from an outer edge of the door panel down to the substrate is suspended therebetween, and is not attached to any surface. Referring to FIG. 6, a gap 50 is defined by the edge of the door panel 24, the substrate 12 and the suspended portion of the adhesive tape 40. It is preferred that the tape 40 has shear adhesion and peel adhesion properties when affixed to steel or plastic significantly exceeding the tensile strength of the tape 40. This insures that the tape 40 will tear over the gap 50 before the tape 40 will slide or peel from the door panel 24 or the substrate 12. The gap 50 preferably corresponds to the pre-weakened seam in the skin covering 42. In this way, the skin covering 42, the underlying foam 44, and the adhesive tape 40 will all preferably fracture along substantially the same U-shaped line.

Specifically, when deployed, the air bag 16 explodes forward exerting a high force against the door panel 24 which will tend to push the door panel 24 outward. The adhesive tape 40 will hold the door panel 24 closed under normal operating conditions. However, when the door panel 24 is pushed outward by the air bag 16, the door panel 24 will exert a peeling force on the portion of the tape 40 that is adhered to the substrate 12. Additionally, as the door panel 24 pivots away from the substrate 12, the tape 40 is pulled in tension which will exert shear forces to the tape 40 which can cause the tape 40 to slide on the door panel 24 and the substrate 12. The adhesive tape 40 preferably has sufficiently high adhesion strength so that under the force of the air bag 16, the tape 40 will tear rather than slide under the shear forces or peel away from the substrate 12 or door panel 24. The tearing fracture of the tape 40 will preferably take place over the gap 50 between the door panel 24 and the substrate 12 because the high adhesive strength of the tape 40 will prevent the tape 40 from tearing in the areas that are attached to the door panel 24 and the substrate 12.

The adhesive tape 40 preferably withstands the range of temperatures that could be experience by the vehicle while maintaining consistent performance characteristics under those operating conditions. The preferred adhesive tape 40 withstands temperatures of up to 300 degrees Fahrenheit and still maintains the adhesive characteristics to perform sufficiently. Additionally, the preferred adhesive tape 40 withstands temperatures of up to 450 degrees Fahrenheit for durations of up to a few hours.

When the instrument panel 10 is formed, the foam 44 between the substrate 12 and the skin covering 42 is typically injected as a liquid which then dries to a solid foam. In prior art instrument panels, it is typical to include a seal or gasket disposed between the door panel 24 and the substrate 12 to fill the gap 50 therebetween and prevent the liquid foam 44 from leaking into the air bag canister 18 prior to hardening. Use of the adhesive tape 40 as described above will provide a seal between the door panel 24 and the substrate 12 and eliminate the need for a seal or gasket.

The instrument panel 10 is preferably formed by providing the substrate 12 with the opening 14. The air bag canister 18 containing the air bag device 16 is then preferably coupled with the substrate 12 such that the air bag 16 will expand outward from the canister 18 through the opening 14 in the substrate 12 when deployed. The door panel 24 is preferably pivotally mounted onto the substrate 12 to provide a cover for the opening 14 that can pivot between an open and closed position.

The adhesive tape 40 is preferably applied to the substrate 12 with the door panel 24 in the closed position such that the tape 40 covers the door panel 24 and extends onto portions of the substrate 12 surrounding the opening 14. The skin covering 42 is preferably extended over the substrate 12 and a liquid foam 44 is preferably injected between the skin covering 42 and the substrate 12 to substantially fill the space and to provide support for the skin covering 42.

Prior to assembly, the door panel 24 is formed from a sheet of metal, preferably aluminum or some other suitable material, and the substrate 12 is formed from a suitable plastic. The skin covering 42 is formed from a suitable material as discussed above, and a pre-weakened seam is formed within the skin covering 42 to provide a controlled fracture point within the skin covering 42. The pre-weakened seam can be formed in the skin 42 by laser scoring, mechanical scoring, molded in groove or any other known method.

Figure 4:
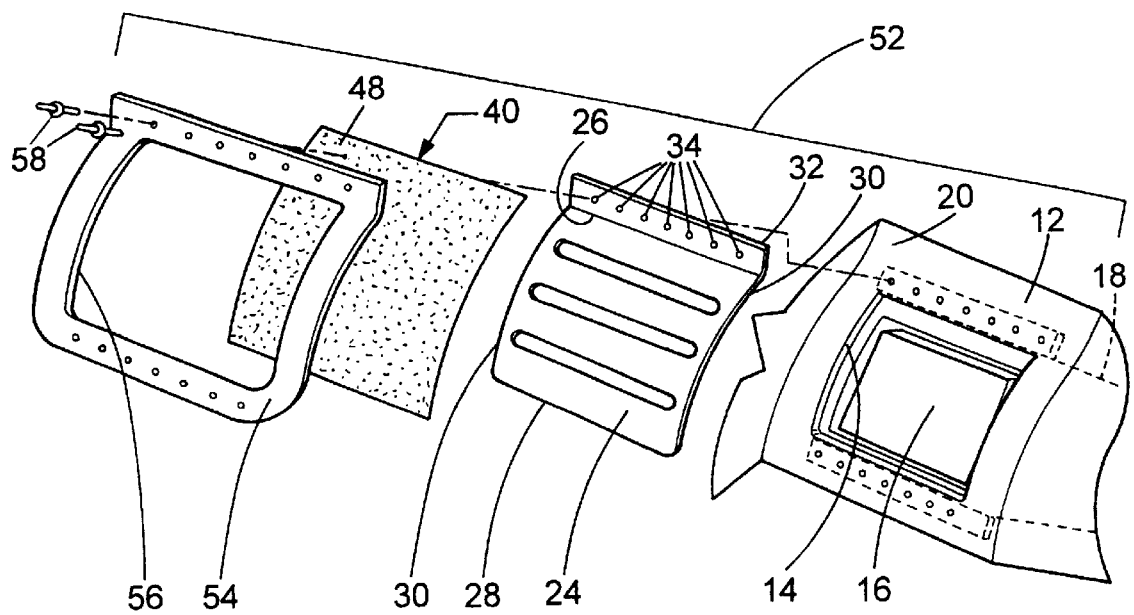
FIG. 4 is an exploded view of a second preferred embodiment of the present invention showing the substrate, the door panel, the adhesive tape, and a compression frame.
Figure 5:
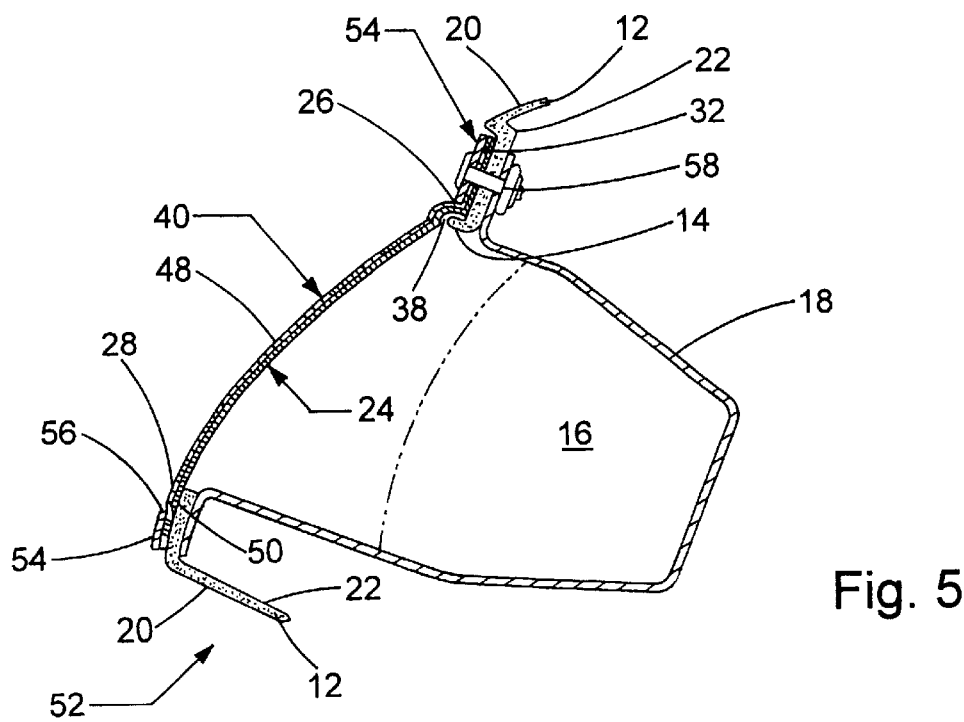
FIG. 5 is a side sectional view of the second preferred embodiment.

Referring to FIGS. 4 and 5, a second preferred embodiment of the instrument panel 52 also includes a compression frame 54 mounted to the substrate 12 to firmly secure the adhesive tape 40 to the substrate 12. The compression frame 54 is preferably made from steel or a similarly rigid material. The compression frame 54 is generally shaped to extend around the opening 14 within the substrate 12 and includes an opening 56 that is substantially the same size as the opening 14 within the substrate 12. The compression frame 54 is preferably attached to the substrate 12 by mechanical fasteners 58 extending around the opening 56. The compression frame 54 also preferably extends over the top flap 32 of the door panel 24.

The compression frame 54 is preferably applied to the substrate 12 after the adhesive tape 40 is applied, and before the skin covering 42 is placed onto the substrate 12. The adhesive tape 40 is preferably held between the substrate 12 and the compression frame 54. This will further insure that the adhesive tape 40 does not release from the substrate 12 and will tear consistently along the gap 50 between the door panel 24 and the substrate 12 when the air bag 16 is deployed.

The adhesive tape 40 used on the second embodiment 52 can be the same tape 40 used in the preferred embodiment 10. It is to be understood, however, that with the additional structure of the compression frame 54 to hold the tape 40 against the substrate 12, an adhesive tape 40 with less stringent characteristics can be used. In the second preferred embodiment 52, most types of adhesive tape 40, like masking tape or labeling tape, could be used to cover the door panel 24 and the substrate 12, so long as the tape 40 exhibits properties that would allow it to tear easily under the deployment force of the door panel 24.

The foregoing discussion discloses and describes two preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. An instrument panel for an automobile passenger compartment having an air bag device, said instrument panel comprising;
   a substrate defining an opening;
   a door panel pivotally connected to said substrate, said door panel being adapted to cover said opening;
   a sheet of adhesive tape which covers said door panel and extends continuously outward beyond a periphery of said door panel onto portions of said substrate adjacent to said door panel, said adhesive tape being affixed to said door panel and to said portions of said substrate to secure said door panel in a closed position and to form a sealed engagement between said periphery of said door panel and said substrate; and
   a compression frame mounted to said substrate over said tape, said compression frame surrounding said door panel to firmly secure said adhesive tape to said substrate.

2. The instrument panel as set forth in claim 1, wherein said door panel and said compression frame are formed from metal and said substrate is formed from plastic.

3. The instrument panel as set forth in claim 2, wherein said door panel includes a flap defining apertures to allow mounting of said door panel to said substrate, and a lip to provide a crease line to allow bending of said door panel from the closed position to an open position.

4. The instrument panel as set forth in claim 3, wherein said compression frame defines apertures to allow mounting of said compression frame to said substrate, said apertures being aligned within said apertures of said flap.

5. An instrument panel for an automobile passenger compartment having an airbag device comprising;
   a substrate defining an opening;
   a door panel pivotally connected to said substrate, said door panel adapted to cover said opening, said door panel including a flap defining apertures to allow mounting of said door panel to said substrate, and a lip to provide a crease line to allow bending of said door panel from a closed position to an open position;
   a sheet of adhesive tape which covers said door panel and extends continuously outward beyond a periphery of said door panel onto portions of said substrate adjacent to said door panel, said adhesive tape being affixed to said door panel and to said portions of said substrate to secure said door panel in the closed position and to form a sealed engagement between said periphery of said door panel and said substrate, said adhesive tape including a tearable paper backing opposite said substrate to strengthen said sealed engagement while allowing tear fracture of said tape when said door panel is forced into the open position by a deployment of said air bag device; and
   a compression frame mounted to said substrate over said tape, said compression frame surrounding said door panel to firmly secure said adhesive tape to said substrate, said compression frame defining apertures to allow mounting of said compression frame to said substrate.

6. The instrument panel as set forth in claim 5, further including a skin covering extending over said substrate.

7. The instrument panel as set forth in claim 5, including a foam disposed between said skin covering and said substrate.

* * * * *